(12) United States Patent
Du

(10) Patent No.: US 6,732,120 B1
(45) Date of Patent: May 4, 2004

(54) SYSTEM AND METHOD FOR PROCESSING AND DISPLAY OF GEOGRAPHICAL DATA

(75) Inventor: Mike Du, Calgary (CA)

(73) Assignee: Geojet Information Solutions Inc., Calgary (CA)

( * ) Notice: Subject to any disclaimer, the term of this patent is extended or adjusted under 35 U.S.C. 154(b) by 829 days.

(21) Appl. No.: 09/148,551

(22) Filed: Sep. 3, 1998

(51) Int. Cl.⁷ .............................................. G06F 17/30
(52) U.S. Cl. ................................................. 707/104.1
(58) Field of Search ................................ 707/104, 526, 707/504, 517, 1, 2, 104.1; 345/112, 352, 226, 803, 968, 156, 163, 168; 340/990, 995.1, 995.19

(56) References Cited

U.S. PATENT DOCUMENTS

| | | |
|---|---|---|
| 5,193,185 A | 3/1993 | Lanter |
| 5,214,757 A * | 5/1993 | Mauney et al. ............. 395/161 |
| 5,418,906 A | 5/1995 | Berger et al. |
| 5,426,780 A | 6/1995 | Gerull et al. |
| 5,751,612 A | 5/1998 | Donovan et al. |
| 5,953,722 A * | 9/1999 | Lampert et al. ............ 707/100 |
| 5,963,956 A * | 10/1999 | Smartt .......................... 707/104 |
| 5,968,109 A * | 10/1999 | Israni et al. ................. 701/208 |
| 5,974,419 A * | 10/1999 | Ashby ......................... 707/100 |
| 6,047,280 A * | 4/2000 | Ashby et al. .................. 707/2 |
| 6,282,489 B1 * | 8/2001 | Bellesfield et al. ......... 701/201 |

* cited by examiner

Primary Examiner—Greta Robinson
(74) Attorney, Agent, or Firm—Blake, Cassels & Graydon LLP; Terry L. Leier

(57) ABSTRACT

A display to display a visual representation of geographic information in a first portion of a display and text information in tabular format in a second portion of a display. The text information is subdivided into a group table and a member list table. The group table lists named groups in tabular form and members of the groups are listed in the member list table. Tabular information may include attachments which are capable of appearing as overlaid graphical representations on the geographic display. A method of coordinating the display of geographic graphical and tabular information provides hide/show capabilities for attachment graphics responsive to selection of tabular information. A method for modelling and storing geographic data is disclosed providing the steps of dividing the spatial extent defined by geographic data into uniquely identified cells, grouping geographic data by cells, and storing grouped geographic data into a long binary field of a database record in a relational database.

22 Claims, 2 Drawing Sheets

SYSTEM AND METHOD FOR PROCESSING AND DISPLAY OF GEOGRAPHICAL DATA

FIELD OF THE INVENTION

The present invention relates generally to data organization and graphical displays and more particularly to a method and system for retrieving and displaying spatial data.

BACKGROUND OF THE INVENTION

Spatial data relating to positioning on the earth's surface is generally referred to as geographic information. Geographic information can include relative positioning information to locate specific locations on the earth's surface as well as to locate features and boundaries. Systems for the storage and retrieval of such information are termed Geographic Information Systems (GIS). Geographic Information Systems are computer processes, systems and data structures that deal with the management and processing of geographic based information. GIS systems generally fall into two categories, namely, file based systems and relational database (RDB) based systems.

File based GIS systems store geographic data in files in accordance with a predefined format which is determined by the vendor of the GIS system. GIS data files are used to record geographic information. The file contents are managed by a GIS system. File based GIS systems are self complete. Such GIS systems rely on internal formats to model and index spatial data for internal use within the geographic boundaries defined by the file. As a result, file based systems are usually fast when the GIS information is accessed from one file. However, management of file based GIS systems is difficult as the geographic area covered by a file is generally limited to a certain size. Accordingly, tens or hundreds of files can be required to store geographic information for areas covering large areas. There are several such systems available on the market including, for example, ESRI's Arc/Info product which is a file based GIS system. Using such a file based system to manage the property based map of a city of approximately eight hundred thousand people requires significant resources including the need to maintain as many as three hundred files in the Arc/Info proprietary format.

There are RDB based systems available in the market as well such as the VISION (trademark) system of Systemhouse Ltd. For RDB GIS systems, data is stored in a relational database where it is managed by a relational database management system (RDBMS). With an RDBMS, only a single database is required in place of the many files relied upon by a file based GIS system. With an RDB system, each geographic object is represented as a record in a first table. A separate index table is used to store the spatial index of each geographic object. When retrieval of geographic objects within a predefined spatial region is required, the index table is queried or examined to locate all objects which are within the query region. The records selected for the geographic objects are then retrieved from the first table. Access to geographic objects stored in an RDB system is generally characterized as slow or low speed when requiring large numbers of records to be retrieved and processed to satisfy a query.

What is needed is a GIS system to present geographic objects with the speed and ease of file based systems while maintaining the data management benefits of an RDB system.

SUMMARY OF THE INVENTION

In a geographic information system (GIS), geographic data are organized by hierarchical levels. The upper level of the hierarchy include larger spatial objects such as national boundaries and national highways. The lower level includes smaller spatial extents such as land parcel boundaries. Each level in the hierarchy layers may have its own coordinate reference system and an associated coordinate transformation system to transform a geographic location on the earth to the coordinate reference system used in the hierarchical level.

In accordance with one aspect of the invention, the spatial extent of each layer or level of the hierarchy is subdivided by a predefined partitioning strategy. The partitioning strategy for the geographic extent may include any useful strategy to define a partition space within the boundaries of the geographic space of the hierarchical layer. For example, the geographic space can be partitioned using a partitioning strategy based on equal sized cell grids, voronoi diagrams, political jurisdiction boundaries or any user defined shape such as township boundaries or legal land descriptions. The partitioned space is called a partition, a sub-space or a cell. Each cell is assigned a unique identifier, such as a number, to uniquely identify the cell. The unique cell identifier is referred to as a spatial index.

The extent of a hierarchical level contains numerous spatial objects. In accordance with the invention, these spatial objects are assigned a spatial index. The spatial index of a spatial object is defined by the cell the spatial object lies in. If one spatial object overlaps more than one cell than, its spatial index may be defined by the cell that the object overlaps with the most. Spatial objects on each level are grouped by their spatial indices, i.e. the cells they are located in. The grouped objects are stored in a long binary column of a table in a relational database along with another column storing the identification of cells. In this way, once the identification of a cell is known, the spatial objects overlapping with the cell can be directly and quickly loaded from the long binary field. This approach to store the spatial objects with their spatial indices is called a space-based approach, compared to the object-based approach currently used in RDB based systems. In RDB based systems, the spatial indices are stored with spatial objects. In other words, the identification of a spatial object is the primary key in a spatial index vs. spatial object identification relational table.

After the geographic space is partitioned by a partitioning strategy, GIS spatial data for a partition can be stored in a long binary field of a table in a relational database. The format of the long binary spatial data is user definable and conforms to the spatial data defined by the GIS system. For example, if the space is partitioned into 20 cells, there will be 20 records with long binary fields to hold the GIS spatial data corresponding to each cell.

In another of its aspects, the invention provides a display system to display visual representations of geographic information in the form of a map displayed in a graphical display area overlaid by spatially coordinated attachments. The graphical display area of visual information depicting a map region of interest is overlaid with visual representations of attachments and is coordinated to a display area of textual information of a plurality of groups or collections of user defined categories of such attachments. The user defined categories group attachment objects corresponding to like attributes to form a collection of such objects. Each attachment object or member of the attachment group or attachment collection is capable of visual depiction at a location in a graphical display of the map. The user defined categories are capable of further coordination with a user controllable tab list display area of information identifying particulars of each of the members of the collection or group of attachments. Collections or groups of attachments may be further grouped into super groups or categories.

Selecting an attachment category in the category display area will cause a display of the attachment tabular information in a coordinated tabular display area. Selecting a record or item in the tabular display area will highlight the graphical representation of the selected item in the graphical display area of the graphical display. Selecting a graphical representation of an item in the graphical display area will select the attachment category and the record (item) respectively in the category display area and the tab list display area. Thus, there are three coordinated information display areas which present graphical and textual information in an interrelated manner.

In another of its aspects, the invention provides a display system providing a graphical display area to display visual representations of geographic information in the form of a map coordinated with textual descriptor displays. The display area of visual information depicting a map region of interest is coordinated to a display area of textual information of a plurality of groups or collections of user defined categories. The user defined categories group objects having like attributes to form a collection of such objects. Each object or member of the group or collection references a location in the geographic display area. The user defined categories are capable of further coordination with a user controllable tab list display area of information identifying particulars of each of the objects or members of the category collection or group.

In another of its aspects, the invention provides a map/attachment architecture. The inventive architecture complements the invented space-based approach to model and store spatial data in a relational database. One drawback of the space-based approach is that it is difficult to search a particular spatial object although the identification of the spatial object can be packed in the long binary data blocks and the attributes of the spatial object can be stored in another table with the identification of the spatial object as the primary key. The map/attachment architecture separates spatial objects that are best modeled by an object-based approach from spatial objects that are best modeled by a space-based approach. The separation is subjective. For example, in a crime analysis system used by police services, the street map objects (street lines and street names) are map objects in the map/attachment architecture; the crime data (crime types and locations) are attachment objects. In another street maintenance system, street line segments are attachments. Generally, the map objects are spatial objects in a background map. They are often termed base map objects. Attachment objects are spatial objects users want to view and analyze in a spatial context. They are generally stored as records in a relational table, or records in several related tables. Each record (retrieved from one or more tables) is called an attachment object. An attachment is a collection of records retrieved from the same table or tables defined by the same search criteria. Attachment objects are further grouped by categories for easy management.

In another of its aspects, the invention provides a structure to store attachments and attachment categories in a relational database. Two tables are used to store attachments and attachment categories. The schemas allow nested attachment categories.

In yet another of its aspects, the invention provides a data structure and method to generalize the spatial translation of an attachment object. The method enables the translation of spatial coordinates from other parameters such as street address. The translation produces spatial coordinates for an attachment that has storage and identification rules separate from that of the GIS system. The spatial coordinates translation can be effected dynamically at run time or can be recorded in the data structure when an attachment record is inserted into the database.

BRIEF DESCRIPTION OF THE DRAWINGS

The preferred embodiment of the invention together with useful variations will now be described with reference to the drawings in which.

DETAILED DESCRIPTION OF THE PREFERRED EMBODIMENT

Figure 1:
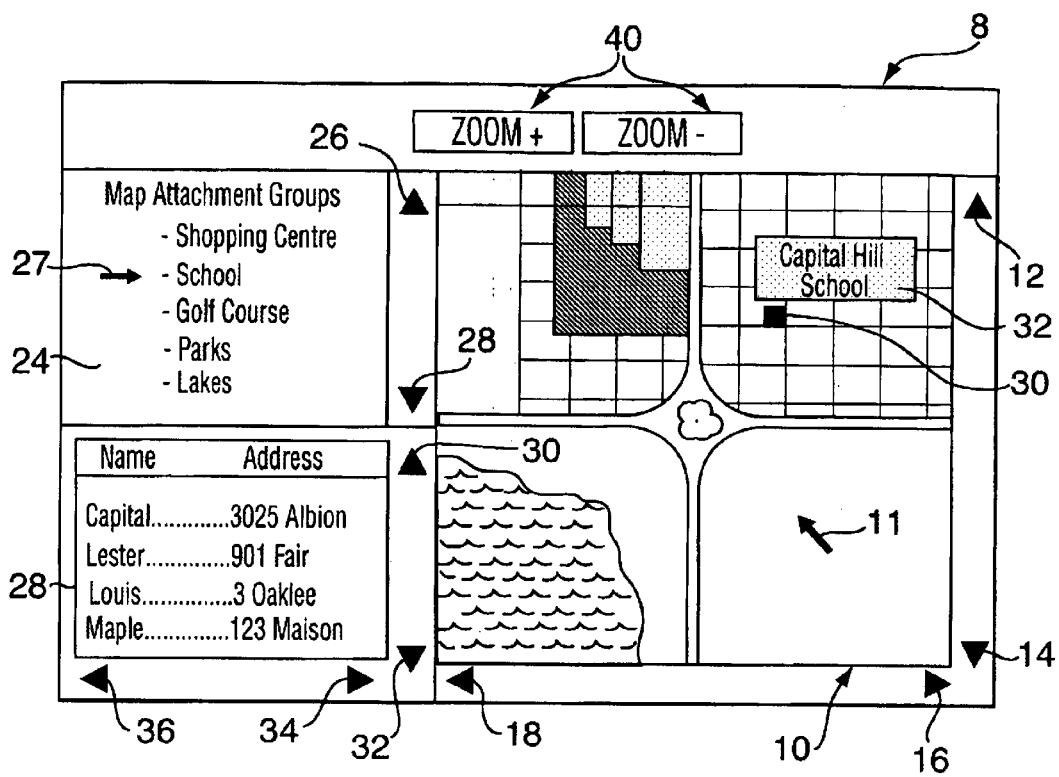
FIG. 1 depicts a graphical display in accordance with a preferred embodiment of the invention illustrating the display of coordinated GIS information.

FIG. 1 shows a representation of a graphical display produced in accordance with the principles of the invention. The display, referenced generally by reference numeral 8, is produced on a video display terminal showing output from a graphics processor such as, for example, a personal computer. The video display terminal and the components of a computer system to produce images on it are described in more detail with reference to FIG. 2. The graphical display 8 is organized into three independent but interrelated display areas 10, 24 and 28, each having an associated set of graphical display controls.

Figure 2:
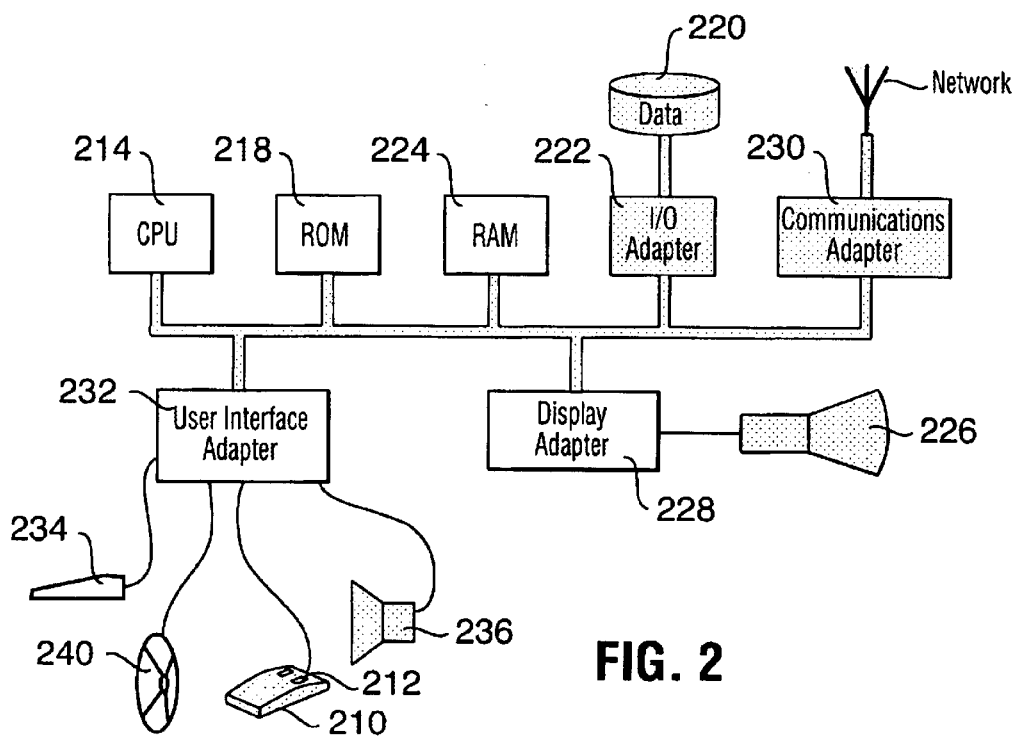
FIG. 2 is a functional block diagram of a computer system adapted to execute the process of the GIS system of the present invention.

The right portion of the display 8 provides a graphical display area 10 to display a graphical representation of a region of a geographic extent. For example, a map is shown which has been selected for viewing by the user. Adjacent to the display area 10 are graphical icons representing control means 12 and 14 which the user can interact with to scroll the map being displayed in display area 10 upwardly or downwardly. Typically, user interaction is achieved by the user manipulating a mouse device 210 (as shown in FIG. 2) to position a pointer icon 11 over control means 12 (for example) to cause the viewing region to move upwardly on the map. Similarly, horizontal control means 16 and 18 are used to move the viewing region in a leftward or rightward direction by interacting with control means 16 or 18.

An image of the geographic extent in view is graphically displayed in graphical display area 10. The image displayed can be a bitmap image that has been converted to digital form (i.e. scanned in using an optical scanner, not shown) or the image can be generated from vector graphics depending on the native image system of the GIS system. Any particular underlying graphical format that can be used to produce the image or map appearing in graphical display area 10 is useful. All that is required is that the format of the graphical data of the image is capable of producing a visual depiction of the map in the graphical display area 10. Coordinated with the display of the map image are spatial data which provide spatial references for particular points or coordinates within the area of the map depicted in the graphical display region 10. The use of such spatial data is described below and also in more detail with reference to FIG. 3.

Group display area 24 is used to list names of collections or groups of map attachments. The collections are named by the user to group attachments that are similar in accordance with predefined characteristics specified by the user. In the example list shown in group display area 24, there are five named collections of map attachments listed, they are: "shopping centre", "school", "golf course", "parks" and "lakes". The number of named attachment collections, or names, could be larger than is permitted to be displayed within group display area 24. In such a situation, the list of group names can be traversed by operating control buttons 26 and 28 to move the group name list upwardly or downwardly within the group display area 24. A group selection indicator 27 is provided to indicate to the user which group of map attachments has been selected. A tabular display area 28 provides of list of text descriptions of the members corresponding to the selected group name indicated by group selection indicator 27.

The group selection indicator 27 is shown by way of example as an arrow. The arrow is pointing to the group "school" to indicate the group is selected. As will be understood by those versed in the art, group selection indicator 27 can be any suitable visual indicator to signify the group selected or under consideration. For example, a coloured bar can be used to provide an alternate coloured background to the text of the selected group in place of the arrow pointer group selection indicator 27 shown in the group display area 24.

Textual descriptions of the individual attachments corresponding to the group name selected by the group selection indicator 27 are displayed in tab list display area 28. The contents of tab list display area 28 is any textual information to identify individual members of the group selected. In the example shown, the "name" and "address" of individual "schools" are listed within tab list display area 28. When required, tab list display area 28 can be provided with scroll control means 30, 32, 34 and 36 to control the vertical and horizontal displacement of the tab list information appearing in tab list display area 28.

Moving group selection indicator 27 can be configured by the user to cause a visual representation of the individual attachments that are members of the selected group to appear within the graphical display area 10. As shown in FIG. 1, an individual school is depicted by attachment graphic 30. This graphic 30 corresponds to a particular instance or member of the school group indicated by group selection indicator 27. The graphic 30 has been "attached" to the map using the spatial coordinates translated from the school to the coordinate system of the map. Once such an attachment is made, the corresponding attachment graphic 30 is then visually oriented to be graphically displayed or overlaid on the map at the map location corresponding to the particular school as depicted by graphic 30.

Proximal to school graphic 30 is a text box 32 which contains textual information to identify or provide text of particulars of the school which is within the graphical display area 10. Text box 32 may appear automatically as the user manipulates group selection indicator pointer 27 to move to various groups along the list. In other words, interaction with the information displayed in group display area 24 can cause the tabular text appearing within tab list window 28 to change and can also cause the graphical depiction corresponding to particular attachments appearing within display area 10 to change. The graphical depiction of corresponding to attachments shown within display area 10 can change in a number of ways. The graphical depiction of the attachment, for example school graphic 30, may change in appearance or colour, or it may cause a text box 32 to appear automatically. Alternately, selection of particular groups within the group display area 24 may cause no change within the display area 10. Alternately, selection of the group "school" by positioning the group selection indicator 27 to that group may enable the pointer icon 11 to produce the text box 32 when the pointer icon 11 is proximal to a graphical depiction of the attachment that corresponds with the selected group. In the example given, when pointer icon 11 is translated proximal to school graphic 30, the display system of the invention responds by making text box 32 visible with the contents to be shown, as for example, "Capital Hill School".

Referring to FIG. 2, there is shown a functional block diagram of a personal computer adapted to process the information to produce a graphical display in accordance with the invention. A personal computer has a CPU 214 operating under an operating system such as OS/2 (trademark) from IBM or WINDOWS (trademark) of Microsoft Corporation. The CPU communicates over communications data paths 216 with one or more peripherals including read only memory 218 used for power on self test and program loading when the computer is switched on. Run time data and programs under execution are loaded from a data disk 220 through an appropriate 10 adaptor 222 into program random access memory 224 for execution by CPU 214. The operation of the programs controlling the computer are visually output to the computer user on a visual display 226 which is operated by a display adaptor 228 interconnected with the data path 216. A communications adaptor 230 may be provided to allow the computer to interact with external computers over a network such as a dial up access to the Internet over the public switch telephone network or access to a local area network of other computers. User interface adaptor 232 is provided to capture output from the user through interaction with various devices suited for that purpose including: a keyboard 234 which is used for text and typing forms of user input and a mouse 210 to provide positional forms of user input to locate user position indicator 11 previously described with reference to FIG. 1. Other user input/output devices may include a speaker 236 for providing audio output to the user and a microphone 240 for capturing audio input from the user.

Figure 3:
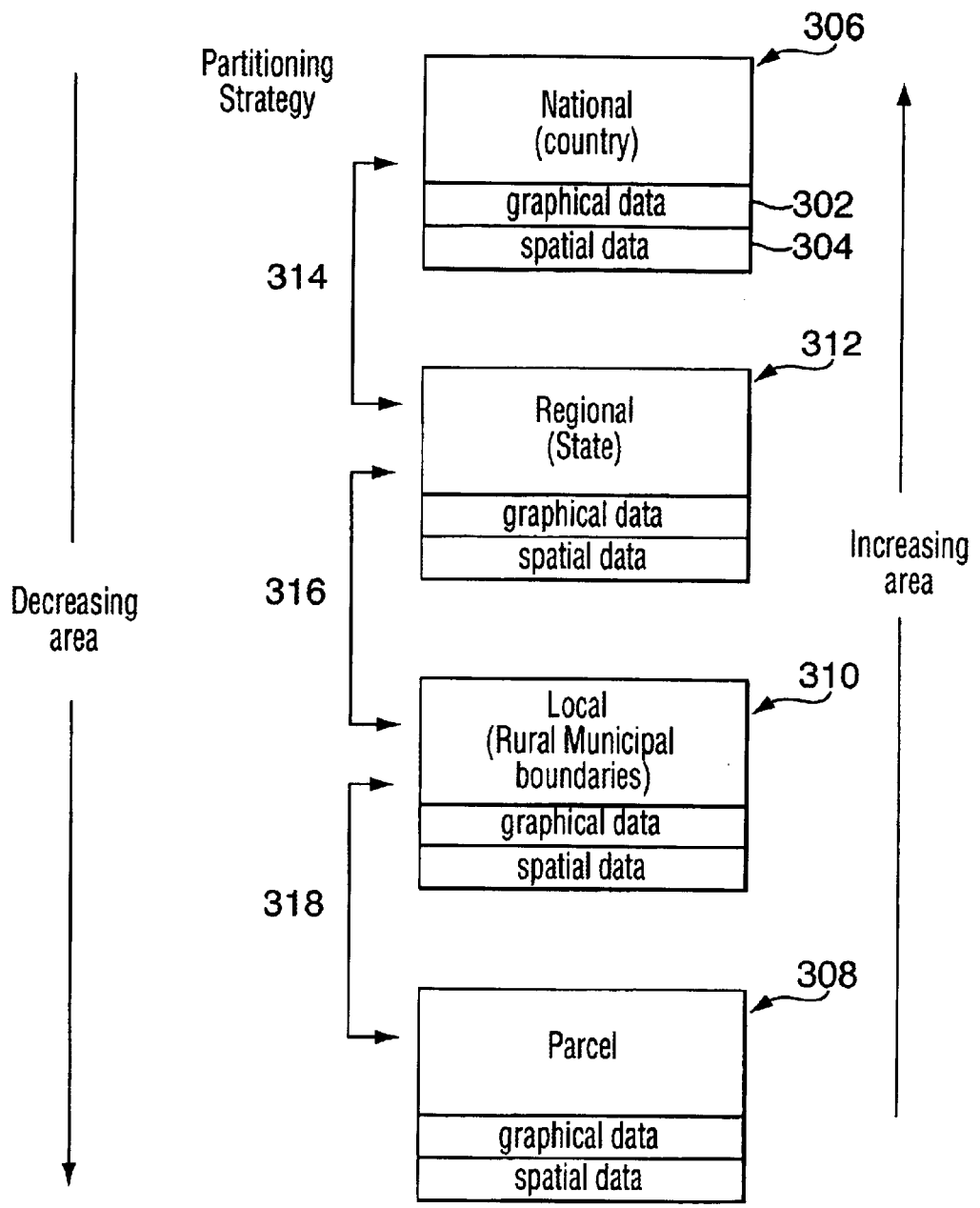
FIG. 3 is a diagram showing the hierarchical base map relationships for storage of GIS information in accordance with the present invention.

Referring to FIG. 3 there is shown a layered hierarchical data structure for storing the geographic information in accordance with the present invention. The hierarchy is organized from collections of maps where each map provides a graphical data portion 302 and a spatial data portion 304. Collections of maps relating to a larger geographic area are provided at the upper layer of the hierarchy 306. Collections of maps relating to a smaller geographic area are provided at the lower layer of the hierarchy 308. In the example data organized in accordance with the invention, the smallest geographic area is a parcel boundary map layer generally referenced by the reference numeral 308. The map information includes a graphical data portion 302 capable of producing a visual depiction of the map and a spatial data portion 304 to provide a coordinate system for positions within the plane or volume defined by the map.

Additional map layers may be readily provided organized, for example, by increasing area including local regions such as rural boundaries or municipal boundaries as found for example within city limits. Data representing this larger geographic area is shown in the adjacent upper layer in the hierarchy at level 310. Other higher levels of mapping may also be included. For example, a regional map or a state map as shown in the hierarchy at 312. Similarly, a larger geographic area can be depicted by a map including an entire nation or country as shown by hierarchical level 306.

Where multiple levels in a hierarchy of map of increasing area are incorporated into the map database, it is necessary to establish relationships 314, 316 and 318 between adjacent map levels in the hierarchy. The relation allows a user to "zoom down" by manipulating the user input devices, such as the mouse 210 to interact with display area 10 to update the display 10 to show the graphical data corresponding to the decreased area map next down in the hierarchy that corresponds to the portion of the increased area map graphically then displayed within the visual display area 10. The interrelationship between adjacent levels of maps within the hierarchy are established by forward and backward relationships 314, 316 and 318. By providing spatial relationships between the increasing area maps and decreasing area maps, the user may interact with the graphical display 10 to zoom in or "drill down" for more detail or to zoom out for more coverage.

A framework for hierarchical organization of spatial data in accordance with the invention as described above with reference to FIG. 3 can be implemented in a relational database system (RDB) such as, for example, Microsoft Access (trademark) database system or similar database system such as any Open Database Compliant (ODBC) database system. Spatial data corresponding to one cell spatial location of one instance of a map at one level of the hierarchy is stored as one record in the RDB database. The coordinates provided by the spatial data of the particular location can be saved as a long binary data type. The following is a table setting out the schema of such a database table:

SCHEMA 1

| Columns | Type | Meaning |
|---------|------|---------|
| Cell ID | INT | Identification (index) of the spatial cell |
| . | | |
| . | | Columns for non-spatial attributes |
| . | | |
| Data | Long Binary | Spatial data within this group |

To understand the advantages of the invention, the following example is given. Let us assume that a set of two-dimensional (2D) geographic objects are modeled by hierarchical levels. At level a given level, assume the space is partitioned by a set of coordinate grids resulting in 900 cells. To further define the example, assume that within a selected cell, say cell 450, there are five hundred land parcels and one thousand texts at the level under consideration. Let us further assume that four tables are used to store these spatial objects in a conventional (two-dimensional) 2D RDB-based GIS system. In a conventional prior art 2D RDB-based GIS system, the schemas for such spatial objects are defined as follows.

Prior Art

Schema of Table: Spatial Object

| Object ID | Object Type | Point Sequence No. | First Coordinate | Second Coordinate |
|-----------|-------------|--------------------|--------------------|-------------------|

Schema of Table: Land Parcel

| Object ID | Land Parcel ID | Boundary Color | ... |
|-----------|----------------|----------------|-----|

Schema of Table: Text

| Object ID | Text String | Text Color | ... |
|-----------|-------------|------------|-----|

Schema of Table: Spatial Index

| Object ID | Spatial Index ID (Cell ID) | ... |
|-----------|----------------------------|-----|

With such a prior art 2D RDB based GIS system, in the example under consideration if each land parcel contains six points, then 4000 records of table: Spatial Object; 500 records of table: Land Parcel; 1000 records of table: Text; and 1500 records of table: Spatial Index are needed to store the spatial objects in this selected cell. Thus, four tables and seven thousand records are used in total. When users want to browse spatial objects in this cell, the four tables have to be accessed to retrieve the seven thousand (7000) records. Then the retrieved data has to be processed to construct the 500 land parcels and 1000 texts in a memory representation form for the spatial objects.

However, if the same spatial objects of the example are stored in the data structure in accordance with the invention, only one record is needed as illustrated in the table defined by Schema 1 and as more particularly explained with reference to an example as follows:

Method to Model and Store Spatial Data in a Relational Database

Schema 1 depicts a schema in accordance with the invention to facilitate the modeling and storing of geographic data in a long binary column of a table in a relational database. The first column is the cell ID (identification) of cells generated by a partitioning of the spatial extent defined by geographic data. The cell could be any shape in addition to a rectangle or a cubic. The data column is a long binary column to hold spatial objects that are within or intersect with the cell. There is provision for other columns to store non-spatial attributes common to the spatial objects packed in the long binary fields. For example, one non-spatial attribute could be an ID of the level the spatial objects are assigned to in a hierarchical modeling of spatial data. Another non-spatial attribute column could be a type code (line, polygon, text, etc.) of the spatial objects packed in the long binary data block. The significance of the data organized in Schema 1 is that the spatial objects that are within or intersect with a cell are packed in a long binary data block and that the long binary data block is stored in the long binary field of a record identified by the ID of the cell.

A schema in accordance with the Schema 1 as described provides the following advantages:

1. The spatial data can be grouped by a predefined space-partitioning strategy. The grouped spatial data can be stored in a long binary format of a table in a relational database. The format of the long binary data can be identical to the internal representation of spatial objects inside a GIS system. Accordingly, the spatial objects can be loaded into memory directly group by group with one record retrieval. No conversion from the representation of spatial data in the Schema 1 format to the representation in the internal GIS format is required.

2. Because the geographical objects are grouped and stored in a long binary column identified by the identification of the partitioned space, the number of records to retrieve in response to a browse is substantially reduced. For example, if a user wants to browse lot boundaries inside a block, the following steps are required to retrieve the data from the database in a traditional RDB-based GIS system.

A. Determine the spatial index of the block.

B. Find all the spatial objects whose spatial indices overlap with that of the block.

C. Retrieve the contents of the spatial objects reported in Step B. Because there are many objects inside the block and each object is stored in one record in the database, many records need to be retrieved.

Where the spatial object data is stored in accordance with the invention, the required steps are:

A. Find all the cells (partitioned space) which overlap with the block.

B. Retrieve each cell record to obtain the spatial objects within these cells.

No processing is necessary to locate all the objects inside the cells because the objects within a cell are stored associated with the cell. Because the number of partitioned cells within a block is substantially less than the number of spatial objects inside the block, the number of records to retrieve is significantly reduced.

The result of organizing data in accordance with the above schema to store base map data is that excellent query response time is achievable when the database is used for browsing and viewing maps.

The following table lists an example record for spatial objects stored in accordance with Schema 1 of the invention

| Non-Spatial Attributes | | | |
|---|---|---|---|
| Cell ID | Level ID | Type ID | Data |
| 450 | 4 | 1 | Long binary data block holding 500 parcels |
| 450 | 4 | 2 | Long binary data block holding 1000 texts |

Using the example record, for users to browse the spatial objects in cell 450, only one table needs to be accessed and only one record is retrieved from that database table to obtain the spatial objects (TYPE 1D=1). Because the spatial objects are packed in the long binary data block in a format identical to their internal representation in a GIS system, the spatial objects can be directly loaded from the long binary data block. No processing is necessary to convert the database table format of a spatial object to its GIS internal format. Thus modeling and storing spatial data in accordance with the invention results in a substantially shortened response time to browse spatial objects in a GIS system.

Base Map/Attachment Architecture

The following describes the architecture for organizing a database to produce the three pane graphical display described with reference to FIG. 1. The graphical display depicted as FIG. 1 outputs attachments made to a base map where those attachments are shown as a graphical representations that appear in graphical display area 10. An attachment is graphically overlaid on the base map to present a display of the base map including the attachments which have been added as map features. As described with reference to FIG. 1, any text information that describes the attachment can appear in text box 32 which is referred to as bubble text. This may also be referred to as the bubble text property of the attachment. Moreover, attachment tabular information can be listed in tab list display 28, this may be referred to as the attachment tab information property. Attachments can be grouped into named groups and this can be referred to as the attachment group property. The group name information is provided in group display area 24. In accordance with the invention, these attachments and non spatial attributes are linked to the underlying map spatially and graphically. The steps to link an attachment to a base map include the following:

select type and name of the database containing the attachment;

select the table/view name or construct a Structured Query Language (SQL) statement for the attachment to be attached;

give a name to the attachment;

select a predefined attachment method;

define a graphical representation for the attachment;

define bubble text;

do attachment.

The bubble text is the text information displayed "on-the-fly" in text box 32 when the mouse cursor 11 is moved over or resting on or proximal to a graphical representation 30 of the corresponding attachment. The bubble text information is retrieved from the BUBL_COLS field of a table in a database organized as described below.

Attachments are stored in two tables in the database. The group name table that provides the information appearing in the upper left group display area 24 includes the following schema:

| SCHEMA 2 | | |
|---|---|---|
| Field Name | Field Type | Description |
| ID | Number | Identification of an attachment category |
| PARENT_ID | Number | Identification of the parent category |
| NAME | Text | Name of the category |
| TYPE | Number | 0: General native attachment; 1: MLS Link; 2: User attachment |
| SW_SELD | Yes/No | If Yes, this item will be displayed in map window only when selected |
| DYNAMIC | Yes/No | If Yes, this item link will be refreshed on-the-fly |
| COM_OBJ | Text | Component Object Module (COM) object name if this is a plug-in attachment category |

Each attachment category will have an ID starting from number 1 and a parent ID. If the parent ID is zero, the attachment category has no parent. The type code of an attachment category is defined by a GIS system. For example, a special type code will be given if the category is defined by an external (third party) software components. The name field contains the text string displayed in the category pane. The show_selected field contains an indicator of whether the attachments of the category will be displayed only when it is selected. The dynamic field defines whether the attachments of the category will be refreshed on-the-fly. The com_obj field contains the COM object name if the category is of type user-defined.

A schema for a table to contain the data defining the location and graphical depiction of an attachment in graphical display area 10 as well as to contain the tabular information to particularize the attachment displayed in tabular display area 28 is as follows:

SCHEMA 3

| Field Name | Field Type | Number | Description |
|---|---|---|---|
| ID | Number | 1 | Identification of attachment |
| CATEGORY_ID | Number | 2 | ID of the category it is assigned to |
| NAME | Text | 3 | Name of attachment |
| DB_TYPE | Number | 4 | Type of database the attachment is stored in |
| DB_NAME | Text | 5 | Name of the database the attachment is stored in |
| SEL_STMT1 | Text | 6 | SQL select statement to define the attachment |
| SEL_STMT2 | Text | 7 | SQL select statement to define the attachment |
| BUBL_COLS | Text | 8 | Defines the field which bubble information is stored in and retrieved from |
| VISIBLE | Yes/No | 9 | May be turned off in graphical display |
| TM_PROCESSED | Date | 10 | Time the attachment is attached |
| GEOCODING | Long Binary | 11 | Definition of graphical representation |
| GEOCODING | Long Binary | 12 | Graphical representation |

Schema 3 is used to provide a mechanism that allows the attachment tabular information appearing in tabular display area 28 to be visually coordinated with a location on the map appearing in graphical display area 10 or an attachment graphic 30 appearing within graphical display area 10. The mechanism allows the tabular data to be translated into a location on the map appearing with in graphical display area 10. The mechanism allows translation from the tabular information to a location on the map based on a process which is carried out to convert the tabular information to a map location.

Fields 4–7 define the source of the tabular information. Field 11 defines how the tabular information is translated into a spatial object which can be displayed directly on the map. Field 12 stores the result of the translation. Fields 11 and 12 contain the spatial information to locate an attachment in the spatial extent of the geographic data as well as graphical data to define the graphical depiction of the attachment 30 in the graphical display 10. Fields 11 and 12 are defined as long binary to provide user definable flexibility to define the translation mechanism and how to store the results. Field 8 defines fields whose value should be retrieved and displayed on-the-fly when the mouse cursor is moved over the graphical representation of a tabular record in the graphical display area 10.

An example of where a translation mechanism is required is street addresses. Generally, street addresses are maintained and assigned by a municipality. Such street address data is what is presented as an example of tabular data in tabular display area 28 of FIG. 1. The street addresses correspond to locations on the map presented in graphical display area 10. Because there is no universal method for translating street addresses into map locations, the invention provides for a mechanism that includes either run-time translation, or direct recording of such tabular information as street addresses and the like. For run-time translation, a method or process is invoked to translate the street address into map coordinates. The address information for a particular member of the group appearing within tabular display area 28 can be parsed using the number portion and street name portion of the street address to obtain the spatial coordinates of that address within the map appearing in graphical display area 10. The alternate method of direct recording provides a field in the table containing the tabular information to record spatial coordinates corresponding to a location on the map depicted graphically within display area 10. Schema 3 is general enough to include run time address to spatial coordinate translations or direct recording of spatial coordinates in the table record that corresponds to the selected member appearing within display window 28. In the latter case, no address translation is required at display time as the address to spatial coordinate translation information for the street address was provided when the record was inserted into the database.

The separation of attachment objects from map objects provides a quick response to a browsing request achieved through partitioning of the spatial extent of a map into cells and grouping attachments, or spatial objects into one database record for each cell for retrieval when browsing. Attachments may also be grouped by category and grouped into one database record for each category for retrieval when browsing by category.

The schemas provide a link between base map data, which are supplied by mapping vendors, using spatial references defined by the vendor, and user data defining map attachments, which are maintained by users and need to be viewed and analyzed in a spatial context co-ordinated with the map data.

It will be apparent that many changes may be made to the illustrative embodiments, while falling within the scope of the invention and it is intended that all such changes be covered by the claims appended hereto.

What is claimed is:

1. A computer based graphical system to display geographic information comprising:
   (a) a first display area for presentation of graphical representations of geographic information;
   (b) second display area for presentation of textual geographic information;
   (c) user input means; and
   (d) means responsive to said user input means to control the information presented by said first and second display areas.

2. The system of claim 1 wherein said user input means comprises a keyboard.

3. The system of claim 2 wherein said user input means further includes a mouse.

4. The system of claim 1 wherein said second display area comprises:
   (a) a group display area to display textual descriptions of attributes of groups of geographic information; and
   (b) a tab display area to display textual descriptions of occurrences in said groups of geographic information.

5. The system of claim 1 wherein said graphical representations of geographic information comprises:
   (a) graphical representation of at least a portion of data defining a base map having a predefined spatial extent; and
   (b) graphical representation of data corresponding to at least one map attachment.

6. The system of claim 5 wherein said user input means comprises a keyboard.

7. The system of claim 6 wherein said user input means further includes a mouse.

8. The system of claim 5 wherein said second display area comprises:

(a) a group display area to display textual descriptions of attributes of groups of geographic information; and (b) a tab display area to display textual descriptions of occurrences in said groups of geographic information.

9. A method of operating a computer based graphical system for displaying geographic information comprising the steps of:

(a) displaying graphical representations of geographic information in a first display area;

(b) displaying of textual geographic information in a second display area; and (c) responding to user input means to control the information presented in said first and second display areas.

10. The method of claim 9 wherein displaying textual geographic information further includes the steps of:

(a) displaying textual descriptions of attributes of groups of geographic information in said second display area; and (b) displaying textual descriptions of occurrences in said groups of geographic information in a tab display area.

11. The method of claim 9 wherein displaying said graphical representations of geographic information further includes the steps of:

(a) displaying a graphical representation of at least a portion of data defining a base map having a predefined spatial extent; and (b) displaying a graphical representation of data corresponding to at least one map attachment.

12. The method of claim 11 wherein displaying textual geographic information further includes the steps of:

(a) displaying textual descriptions of attributes of groups of geographic information in said second display area; and (b) displaying textual descriptions of occurrences in said groups of geographic information in a tab display area.

13. A method for modelling and storing data in a relational database related to geographic data defining a spatial extent comprising the steps of:

(a) providing data defining each geographic object within a spatial extent;

(b) partitioning said spatial extent into cells using a partitioning strategy;

(c) generating a unique cell identification for each said cell;

(d) grouping said data defining each geographic object by said unique cell identification to form cell grouped geographic objects; and (e) storing said cell grouped geographic objects in a database record corresponding to said unique cell identification.

14. The method of claim 13, wherein said data defining each geographic object of said cell grouped geographic objects is stored as a long binary field in said database record.

15. The method of claim 13, further including the steps of:

(a) providing a unique hierarchical level identification to define each of a plurality of hierarchical levels;

(b) grouping said data defining each geographic object by said unique hierarchical level identification and said unique cell identification to form hierarchical grouped geographic objects; and (c) storing said hierarchical grouped geographic objects in a database record corresponding to said unique hierarchical level identification data and said unique cell identification.

16. The method of claim 15, wherein said data defining each geographic object of said hierarchical grouped geographic objects is stored as a long binary field in said database record.

17. The method of claim 13, further including the steps of:

(a) providing a unique non-spatial attribute for each of a plurality of non-spatial attributes;

(b) grouping said data defining each geographic object by said unique non-spatial attribute to form non-spatial attribute grouped geographic objects; and (c) storing said non-spatial attribute grouped geographic objects in a database record corresponding to said unique non-spatial attribute.

18. The method of claim 17, wherein said data defining each geographic object of said non-spatial grouped geographic objects is stored as a long binary field in said database record.

19. A method for modelling and storing data defining attachments in a relational database related to geographic data defining a spatial extent comprising the steps of:

(a) providing unique attachment data to define each of a plurality of attachments;

(b) assigning a unique attachment identification code to each said unique attachment data;

(c) providing a unique category description to define each of a plurality of category descriptions;

(d) grouping each said unique attachment data at least one said unique category description to form category description grouped attachment data; and (e) storing said category description grouped attachment data in a database record corresponding to said unique category description.

20. The method of claim 19, further including the step of including a text descriptor with each said unique attachment identification code.

21. A method for modelling and storing data defining attachments in a relational database related to geographic data defining a spatial extent comprising the steps of:

(a) providing unique attachment data to define each of a plurality of attachments;

(b) assigning a spatial index to each said unique attachment data to define the location of said unique attachment data within a spatial extent;

(c) providing a category description for each said unique attachment data;

(d) grouping said unique attachment data by said category description and said spatial index to form category grouped attachment data; and (e) storing said category grouped attachment data in a database record corresponding to said category description.

22. The method of claim 21, further including the step of including a text descriptor with each said unique attachment data.

* * * * *